United States Patent [19]

Koyama et al.

[11] Patent Number: 4,841,326
[45] Date of Patent: Jun. 20, 1989

[54] APPARATUS FOR DETECTING THE FOCUS ADJUSTED STATE OF AN OBJECTIVE OPTICAL SYSTEM

[75] Inventors: Takeshi Koyama; Keiji Ohtaka, both of Tokyo, Japan

[73] Assignee: Canon Kabushiki Kaisha, Tokyo, Japan

[21] Appl. No.: 115,905

[22] Filed: Nov. 2, 1987

[30] Foreign Application Priority Data

Nov. 5, 1986 [JP] Japan ............................... 61-264355

[51] Int. Cl.⁴ ............................................... G03B 3/00
[52] U.S. Cl. ................................... 354/406; 354/402; 354/408
[58] Field of Search ................ 354/400, 402, 406, 408

[56] References Cited

U.S. PATENT DOCUMENTS

| 4,460,260 | 7/1984 | Utagawa | 354/406 |
| 4,526,458 | 7/1985 | Kawamura et al. | 354/406 |
| 4,552,445 | 11/1985 | Mukai et al. | 354/406 |
| 4,699,493 | 10/1987 | Koyoma et al. | 354/406 |
| 4,774,539 | 9/1988 | Suda et al. | 354/406 |

Primary Examiner—Russell E. Adams
Attorney, Agent, or Firm—Fitzpatrick, Cella, Harper & Scinto

[57] ABSTRACT

A focus detecting apparatus is provided with a plurality of pattern forming lenses for forming light patterns whose relative positional relation varies in conformity with the focus adjusted state of an objective optical system from lights passed through different areas on the pupil of the objective optical a sensing device is included for sensing the light patterns and producing a signal regarding the relative positional relation between the light patterns. A light divider is inclined along an optical path passing through the areas on the pupil and has a light-transmitting area through which light is refracted and transmitted. The light divider is disposed between the objective optical system and the pattern forming lenses. The pattern forming lenses are different in shape and are formed asymmetrically with respect to the optic axis of the objective optical system to correct the destruction of the light patterns caused by the light divider.

13 Claims, 4 Drawing Sheets

FIG.3
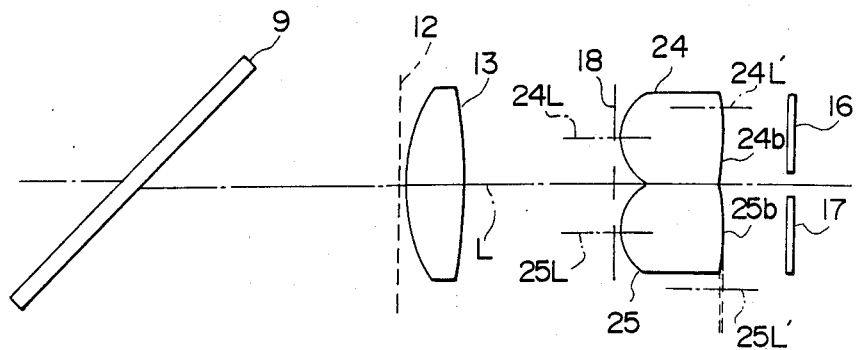
FIG.4A  FIG.4B
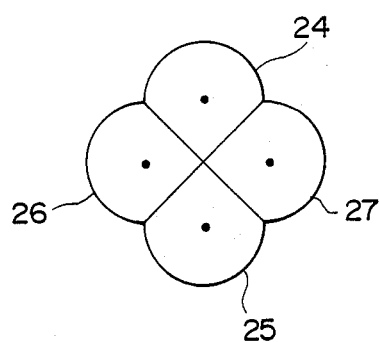 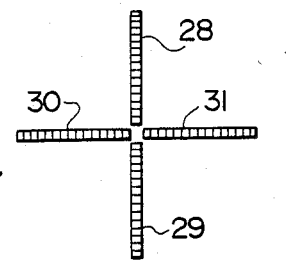

APPARATUS FOR DETECTING THE FOCUS ADJUSTED STATE OF AN OBJECTIVE OPTICAL SYSTEM

BACKGROUND OF THE INVENTION

1. Field of the Invention

This invention relates to a focus detecting apparatus suitable for an optical machine such as a camera, and in particular to a focus detecting apparatus for detecting the focus adjusted state of an objective lens.

2. Related Background Art

In single-lens reflex cameras or the like, a focus detecting system of the so-called image deviation type is known in which light distributions regarding two object images are formed from light beams from two different portions of the pupil of the photo-taking lens and the focus state of the photo-taking lens is detected from the relative positional relation between the light distributions.

FIG. 5 of the accompanying drawings depicts a longitudinal sectional shape of a single-lens reflex camera provided with a focus detecting unit of the image deviation type, and FIG. 6 of the accompanying drawings is a transverse sectional view in which only the optical system is developed and depicted to illustrate the focus detecting action.

In these figures, the reference numeral 1 designates an interchangeably mounted or fixed photo-taking lens, the reference numeral 3 denotes a field lens provided near the predetermined imaging plane 2 of the photo-taking lens 1 (the focal plane in a camera), the reference numerals 4 and 5 designate secondary imaging lenses disposed symmetrically about the optic axis L of the photo-taking lens 1 for forming two object images on the basis of light beams passing through different portions 1a and 1b of the pupil of the photo-taking lens 1, and the reference numerals 6 and 7 denote photoelectric conversion arrays for detecting the respective object images formed by the secondary imaging lenses 4 and 5. The arrays 6 and 7 are constructed, for example, of CCDs (charge coupled devices) or the like on a chip.

The reference numeral 8 designates a mask provided near the secondary imaging lenses. The field lens 3 causes the opening portions 8a and 8b of the mask 8 to be imaged on the different portions 1a and 1b on the pupil of the photo-taking lens 1.

The reference numeral 9 denotes a quick return mirror which is mirror-surface-treated on a light-transmitting substrate except for the aperture near the optic axis, and which is obliquely disposed in the photo-taking optical path during observation and is retracted out of the optical path during photographing. A pentaprism P and an eyepiece E are successively disposed on the reflecting optical path of the quick return mirror 9, and a sub-mirror M, the field lens 3, an optical path inverting mirror M2, the secondary imaging lenses 4 and 5 and the photoelectric conversion arrays 6 and 7 are successively disposed on the transmitting optical path of the quick return mirror 9. PC designates a signal processing circuit which calculates a value indicative of the focus adjusted state of the objective lens 1 on the basis of the signals of the arrays 6 and 7. F denotes the imaging plane on which a silver chloride film or an image pickup element is disposed.

In such an apparatus, when for example, the photo-taking lens 1 is moved leftwardly as viewed in FIG. 6 to provide the so-called forward focusing, light patterns, for example, object images, formed on the light-receiving surfaces of the respective photoelectric conversion arrays 6 and 7 by the secondary imaging lenses 4 and 5 deviate in the direction of arrow and thus, the fact of forward focusing and the amount thereof are detected from the variation in the outputs of the photoelectric conversion arrays 6 and 7 corresponding to the relative deviation of the pair of light patterns. Also, in the case of backward focusing, the respective images deviate in the direction opposite to that in the case of forward focusing and therefore, the fact of backward focusing and the amount thereof are detected.

FIG. 7 of the accompanying drawings depicts the optical action during in-focus in greater detail. The point of intersection between the optic axis L and the surface O of an object to be photographed is O1, and a point off the axis is O2. A light beam emitted from the point O1 is imaged on the photoelectric conversion arrays 6 and 7 by the action of the secondary imaging lenses 4 and 5, and the points at which the light beam is imaged on the arrays are P1 and Q1.

Paying attention to the light beam emitted from the point O2 off the axis, this light beam having a field angle is once imaged on or near the predetermined imaging plane, whereafter it is re-imaged on the photoelectric conversion arrays 6 and 7 by the secondary imaging lenses 4 and 5. The points at which the light beam is re-imaged on the arrays are P2 and Q2. The spacing Z1 between the points P1 and P2 and the spacing Z2 between the points Q1 and Q2 correspond to the images linking the points O1 and O2 together and must therefore be equal to each other.

However, as can be seen from FIG. 5, if an attempt is made to provide a focus detecting unit at the bottom of a camera, the light beam refracted and passed through the substrate of the quick return mirror 9 will be measured. If, at that time, the direction of arrangement of the secondary imaging lenses is made orthogonal to the direction of arrangement shown in FIG. 5, it means that as shown in FIG. 8 of the accompanying drawings, the quick return mirror 9 is disposed in the optical path while being inclined with respect to the direction of division D of the pupil of the photo-taking lens 1. The imaged states of the light beams passed through the portions 1a and 1b of the pupil differ from each other and therefore, even if the various aberrations of the optical system are corrected well, the position of the imaging plane which provides the reference differs depending on the field angle and the aforementioned spacings Z1 and Z2 become unequal. More specifically, as shown in FIG. 9 of the accompanying drawings, Z1−Z2 by the field angle exhibits an inclined characteristic and therefore, even in the case of objects at the same object distance, there arises an inconvenience that the discrimination of the focus state of the lens differs between the central area and marginal area of the distance measurement field.

Accordingly, in the case of an ordinary single-lens reflex camera, optical elements must avoidably be disposed so that the direction of division of the pupil becomes horizontal, and this has been a limitation in the optical arrangement.

SUMMARY OF THE INVENTION

It is the object of the present invention to realize accurate detection even in the case of a detecting optical system including optical elements asymmetrical disposed with respect to the direction of division of the pupil.

To achieve this object, an optical system for forming a pair of light distributions based on an object having their relative spacing varied in conformity with the focus adjusted state of an objective lens is a system optically asymmetrical with respect to the direction of division of the pupil of the objective lens.

BRIEF DESCRIPTION OF THE DRAWINGS

FIG. 3 is an optical sectional view showing another embodiment of the present invention.

FIG. 4 is a front view of the FIG. 3 embodiment,

DESCRIPTION OF THE PREFERRED EMBODIMENTS

An embodiment of the present invention will hereinafter be described with reference to FIG. 1.

Figure 1:
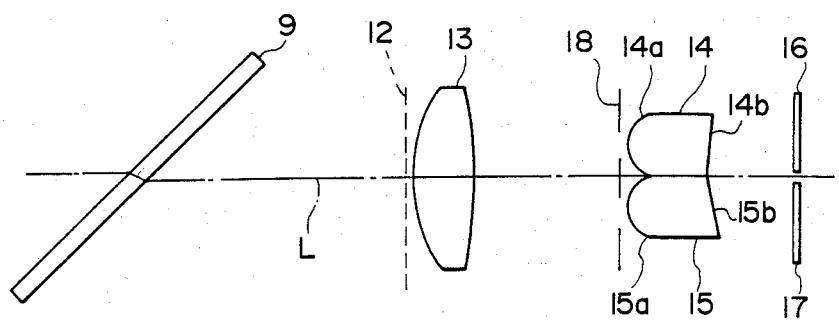
FIG. 1 is an optical sectional view showing a first embodiment of the present invention.

Left in FIG. 1, there lies a photo-taking lens, although not shown. Letter L designates the optic axis of the photo-taking lens. The reference numeral 9 denotes a quick return mirror similar to that described previously. That portion of the quick return mirror 9 which is near the optic axis L is a light-transmitting area.

The reference numeral 12 designates the predetermined imaging plane of the photo-taking lens, and the reference numeral 13 denotes a field lens. In the present embodiment, the field lens 13 is somewhat spaced apart from the predetermined imaging plane 12, but alternatively, it may be disposed on the predetermined imaging plane 12. The reference numerals 14 and 15 designate secondary imaging lenses arranged in the direction of inclination of the mirror 9. In the present embodiment, the secondary imaging lenses 14 and 15 are formed as a unit of plastics with the sides of the two lenses cut off and joined together. The reference numerals 16 and 17 denote photoelectric conversion arrays. In FIG. 1, they are shown divided into two rows, but alternatively, they may be used with a single row being divided into two detecting areas. The reference numeral 18 designates a two-aperture stop. The centers of the respective apertures of this stop 18 are coincident with the optic axes of the secondary imaging lenses, respectively.

Figure 2:
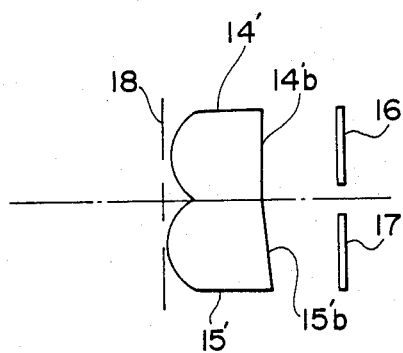
FIG. 2 is a partial sectional view of a modification of the first embodiment.
Figure 5:
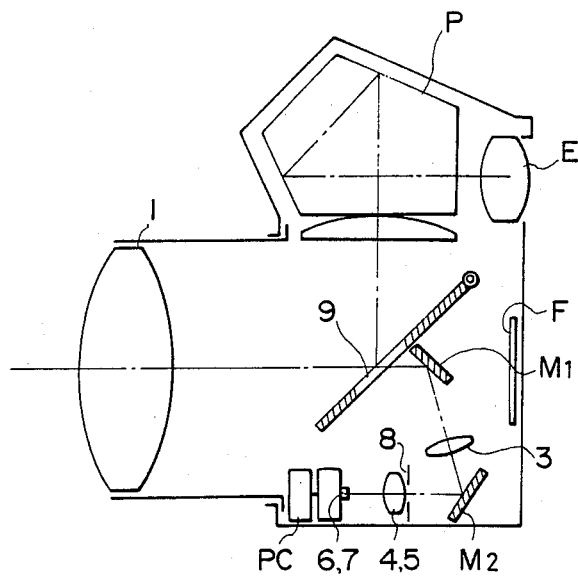
FIG. 5 is a cross-sectional view of a single-lens reflex camera.
Figure 6:
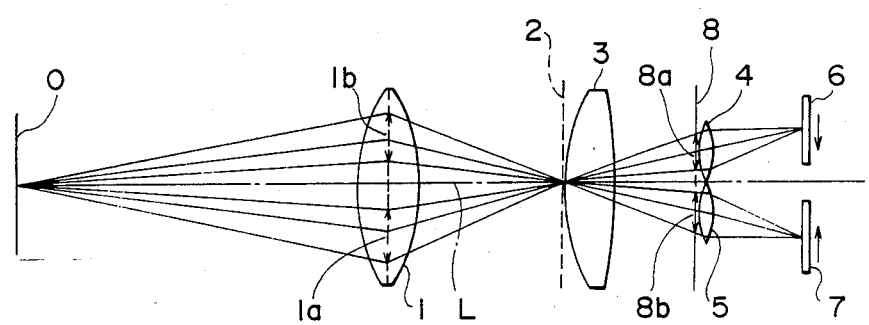
FIGS. 6, 7 and 8 illustrate the optical action.
Figure 8:
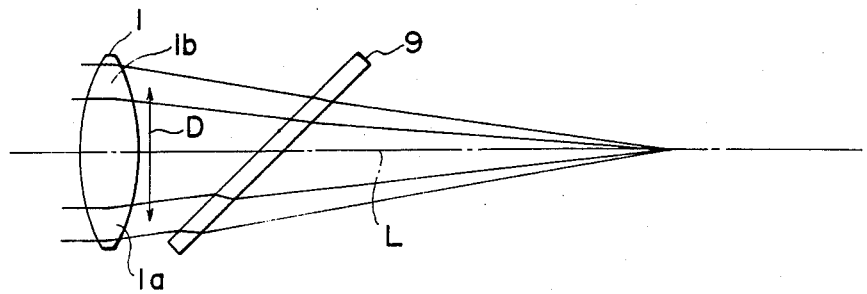
Figure 9:
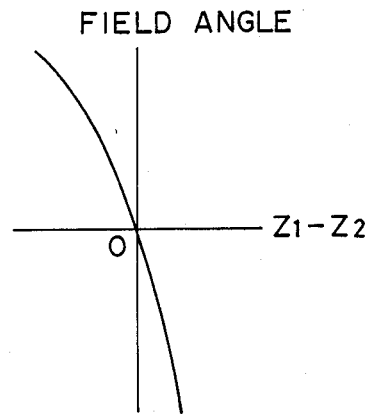
FIG. 9 is a graph of the performance.

The front surfaces of the secondary imaging lenses 14 and 15 provide spherical surfaces 14a and 15a and the rear surfaces provide planar surfaces 14b and 15b. In the present embodiment, the planar surfaces 14b and 15b are both inclined in the direction of arrangement of the photoelectric conversion arrays, and this has been caused due to two angles overlapping each other, and for the matters so far called in question, correction can be made simply by inclining one of these two surfaces. In FIG. 2, the rear surface 14'b of one of secondary imaging lenses, 14', is optically parallel to the light-receiving surface of the photoelectric conversion array 16, while the rear surface 15'b of the other photoelectric conversion array 15' is inclined with respect to the light-receiving surface of the photoelectric conversion array 17. To correct the deviation of the imaging plane shown in FIG. 8, correction can be made with the angle put either upward or downward, and in the arrangement of FIG. 2, correction is made by the rear surface 15'b. Only a light beam of one field angle is depicted in FIG. 8, but actually, it is necessary to correct light beams of various field angles and therefore, the form of the inclined surface like the planar surface 15'b is taken. In this embodiment, the surface 15'b assumes a gentle rightwardly downward inclination, but this is determined by an optical arrangement including other optical elements such as a field lens, etc., and a leftwardly downward inclination is also possible.

Figure 7:
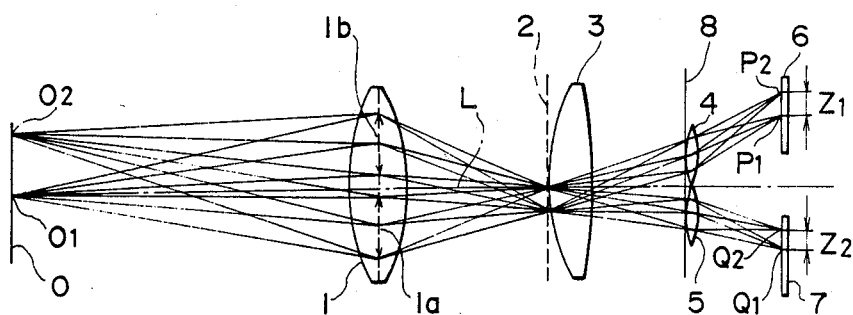

The reason why the rear surfaces 14b and 15b of the secondary imaging lenses of FIG. 1 are both inclined will now be mentioned. This correction is already proposed in Japanese Patent Application No. 143126/1985 (U.S. application Ser. No. 877,850), and in the optical action illustration of FIG. 7, paying attention to light rays travelling from a point lying on the predetermined imaging plane 2 and deviating downwardly from the optic axis L toward the photoelectric conversion arrays 6 and 7, the angle of incidence differs between the secondary imaging lenses 4 and 5 and therefore, a delicate difference occurs between spacings Z1 and Z2 under the influence of the residual aberrations of the lenses. In order to correct this difference, one surface of each of the two secondary imaging lenses is made into a planar surface and these surfaces are equally inclined in the direction of arrangement of the photoelectric conversion arrays. Again in this case, however, the direction of inclination is varied by the optical arrangement.

It is of course more convenient to improvement in accuracy that this correction is used in all the focus detecting systems, but actually, this correction can be adopted in conformity with the practical tolerance limits required of each camera, and there is also an electrically correcting method and in that case, it will suffice to incline one planar surface alone.

In the embodiment of FIG. 1, the correction of both surfaces is adopted to achieve highly accurate detection and avoid the burden of the electrical system and therefore, both planar surfaces 14b and 15b are inclined with respect to the direction of arrangement of the photoelectric conversion arrays and are asymmetrical with respect to the extension of the optic axis L of the objective lens. Also in the present embodiment, the rear surfaces of the secondary imaging lenses are planar surfaces, but alternatively, the front surfaces may be planar surfaces and the rear surfaces may be spherical surfaces.

An example of numerical values will be shown below.

First, the thickness of the quick return mirror 9 disposed in the camera body is 1 mm. Hereinafter, the unit is mm. The imaging plane lies at a distance of 21 from the entrance surface of the mirror 9 along the optic axis, and the first surface of the field lens 13 lies at a distance of 4.6 therefrom.

In the table below, R1 and R2 correspond to the first and second surfaces, respectively, of the field lens, and R3 corresponds to the first surface of the secondary imaging lenses. R is the radius of curvature, D is the spacing between lens surfaces, Nd is the refractive index for d-line, and νd is the abbe number.

TABLE

| | R | D | Nd | νd |
|---|---|---|---|---|
| 1 | 18.8 | 2 | 1.492 | 57.4 |
| 2 | −12.8 | 16.5 | 1 | |
| 3 | 2.7 | 5 | 1.583 | 30.2 |

TABLE-continued

| | R | D | Nd | vd |
|---|---|---|---|---|
| 4 | ∞ | | 1 | |

However, the R4 planar surfaces of the two secondary imaging lenses are valley-shaped, the surface 14b is inclined by 2°10′, and the surface 15b is inclined by 2°45′. The spacing between the optic axes of the two secondary imaging lenses 14 and 15 is 3.6.

The vertically asymmetrical bend of the Z1-Z2 shown in FIG. 8 by the field angle has been corrected by the above-described construction.

FIG. 3 shows another embodiment of the present invention, in which optical elements identical to those in the embodiment of FIG. 1 are given identical reference numerals. The reference numerals 24 and 25 designate secondary imaging lenses whose front surfaces are spherical surfaces. The optic axes of these front surfaces are designated by 24L and 25L, respectively. The rear surfaces of the secondary imaging lenses 24 and 25 are also spherical surfaces, but have a radius of curvature differing from that of the front surfaces, and their respective optic axes are designated by 24L′ and 25L′. The optic axis 24L′ is optically parallel-displaced relative to the optic axis 24L in the direction of arrangement of the photoelectric conversion arrays, and the optic axis 25L′ is likewise parallel-displaced relative to the optic axis 25L. The amounts of displacement are asymmetrical with respect to the extension of the optic axis L of the photo-taking lens. However, again in the present embodiment, it is for the aforedescribed two kinds of corrections that both optic axes are displaced, and if the influence of the quick return mirror 9 which the present application calls in question is eliminated, correction can be made by displacing only one of the optic axes. Alternatively, the optic axes may be displaced in the front surfaces of the secondary imaging lenses.

Further, the secondary imaging lenses each may be comprised of a plurality of lenses. A method of correcting the reduction in performance by displacing lens surfaces is proposed in U.S. application Ser. No. 907,588.

In the above-described embodiment, the apertures of the stop 18, the secondary imaging lenses 24 and 25 and the photoelectric conversion arrays 16 and 17 have been shown vertically disposed in pairs, respectively, but if combination is made with a system in which secondary imaging lenses are horizontally disposed as in the conventional focus detecting system, accurate detection can be realized without being affected by the directionality of an object to be photographed. Such an optical system is proposed in U.S. application Ser. No. 919,506. FIG. 4 depicts the front form of only the unit of secondary imaging lenses, and as shown there, the displacement of the optic axes of the front and rear surfaces of secondary imaging lenses 26 and 27 arranged horizontally is symmetrical.

According to the present invention described above, highly accurate detection can be realized without being affected by an optical member which is rotation-asymmetrical with respect to the optic axis like the quick return mirror, and the inconvenience that the arrangement of the focus detecting system is limited by such kind of optical member can be eliminated.

We claim:

1. An apparatus for detecting the focus adjusted state of an objective optical system, comprising:
   a plurality of pattern forming optical means for forming energy patterns whose relative positional relation varies in conformity with the focus adjusted state by the use of energy passed through different areas of a pupil of the objective optical system;
   sensing means having a plurality of portions and producing a signal regarding a relative positional relation between the energy patterns; and
   optical means disposed between the objective optical system and said pattern forming optical means for asymmetrically varying optical paths passing through said areas of the pupil;
   said pattern forming optical means being arranged in the direction passing through said areas on the pupil and forming an asymmetrical shape with respect to the optic axis of said objective optical system, a first pattern forming optical means having a different shape from a second pattern forming optical means.

2. An apparatus according to claim 1, wherein said optical means comprises a light-transmitting plane parallel plate inclined with respect to the optical paths passing through said areas on the pupil.

3. An apparatus according to claim 2, wherein said light-transmitting plane parallel plate comprises a portion of a quick return mirror incorporated in a camera body.

4. An apparatus according to claim 1, wherein said plurality of pattern forming optical means comprise a plurality of convexo-planar lenses which differ in the inclination of their planar surfaces.

5. An apparatus according to claim 1, wherein each of said plurality of pattern forming optical means includes a biconvex lens having a second lens surface displaced relative to a first lens surface, the biconvex lenses each being different in a magnitude of displacement between the two lens surfaces.

6. An apparatus according to claim 1, wherein each of said plurality of pattern forming optical means has a stop and a lens.

7. An apparatus according to claim 1, further having another plurality of pattern forming optical means arranged in a direction differing from a direction of arrangement of said pattern forming optical means and forming separate energy patterns whose relative positional relation varies in conformity with the focus adjusted state of the objective optical system, and wherein said sensing means further has third and fourth portions each having a plurality of sensors and sensing said separate energy patterns.

8. A camera body used with an objective lens, comprising:
   a quick return mirror having a reflecting area for reflecting a part of a light beam from the objective lens toward a viewfinder and a transmitting area for refracting and transmitting another part of the light beam therethrough;
   an optical assembly having secondary imaging lenses optically arranged in a direction in which said quick return mirror is inclined for receiving the light beam transmitted through said transmitting area and forming energy patterns whose relative positional relation varies in conformity with the focus adjusted state of the objective lens; and
   sensing means for receiving said energy patterns, said sensing means having two portions each having a plurality of sensors, said sensing means producing a signal regarding the relative positional relation between said energy patterns;

said secondary imaging lenses being of an asymmetrical shape with respect to the optic axis of said objective lens, a first secondary imaging lens having a different shape from a second secondary imaging lens.

9. A camera body according to claim 9, wherein said second imaging lenses include convexo-planar lenses which differ in the inclination of their planar surfaces.

10. A camera body according to claim 8, wherein said secondary imaging lenses each include a biconvex lens having a second lens surface displaced relative to a first lens surface, said biconvex lenses differing in the magnitude of the displacement between the lens surfaces.

11. A camera body according to claim 8, wherein said optical assembly has separate secondary imaging lenses arranged in a direction orthogonal to the direction of arrangement of said secondary imaging lenses.

12. An apparatus for detecting the focus adjusted state of an objective optical system, comprising:

a plurality of pattern forming optical means for forming energy patterns whose relative positional relation varies in conformity with the focus adjusted state by the use of energy passed through different areas of a pupil of the objective optical system;

sensing means having a plurality of portions and producing a signal regarding a relative positional relation between the energy patterns; and optical means disposed between the objective optical system and said pattern forming optical means for asymmetrically varying optical paths passing through said areas of the pupil, said optical means comprising a light-transmitting plane parallel plate inclined with respect to the optical paths passing through said areas of the pupil; and said pattern forming optical means being arranged in the direction passing through said areas of the pupil and forming an asymmetrical shape with respect to the optic axis of said objective optical system, a first pattern forming optical means having a different shape from a second pattern forming optical means, said plurality of pattern forming optical means comprising a plurality of convexo-planar lenses which differ in the inclination of their planar surfaces.

13. An apparatus for detecting the focus adjusted state of an objective optical system, comprising:

a plurality of pattern forming optical means for forming energy patterns whose relative positional relation varies in conformity with the focus adjusted state by the use of energy passed through different areas of a pupil of the objective optical system;

sensing means having a plurality of portions and producing a signal regarding a relative positional relation between the energy patterns; and optical means disposed between the objective optical system and said pattern forming optical means for asymmetrically varying optical paths passing through said areas of the pupil, said optical means comprising a light-transmitting plane parallel plate inclined with respect to the optical paths passing through said areas of the pupil; and said pattern forming optical means being arranged in the direction passing through said areas of the pupil and forming an asymmetrical shape with respect to the optic axis of said objective optical system, a first pattern forming optical means having a different shape from a second pattern forming optical means, each of said plurality of pattern forming optical means including a biconvex lens having a second lens surface displaced relative to a first lens surface, the biconvex lenses each being different in a magnitude of displacement between the two lens surfaces.

* * * * *

UNITED STATES PATENT AND TRADEMARK OFFICE
CERTIFICATE OF CORRECTION

PATENT NO. : 4,841,326

DATED : June 20, 1989

INVENTOR(S) : Koyama et al.

It is certified that error appears in the above-identified patent and that said Letters Patent is hereby corrected as shown below:

AT [57] IN THE ABSTRACT:
    Line 6, "optical a" should read --optical system. A--

COLUMN 7
    Line 9, change "claim 9," to --claim 8,--.
    Line 10, change "second imaging lenses" to --secondary imaging lenses--.

Signed and Sealed this

Tenth Day of July, 1990

*Attest:*

HARRY F. MANBECK, JR.

*Attesting Officer*      *Commissioner of Patents and Trademarks*